United States Patent [19]

Fasano et al.

[11] 3,713,121

[45] Jan. 23, 1973

[54] ARM VIBRATION DAMPER

[75] Inventors: Ronald F. Fasano, Los Gatos; Michael R. Hatch; James E. Riggins, both of San Jose, all of Calif.

[73] Assignee: International Business Machines Corporation, Armonk, N.Y.

[22] Filed: May 25, 1970

[21] Appl. No.: 40,033

[52] U.S. Cl. ....................... 340/174.1 E, 179/100.2 P

[51] Int. Cl. ........................... G11b 5/60, G11c 21/20

[58] Field of Search .. 340/174 VB, 174.1 E, 174.1 C; 179/100.2 P

[56] References Cited

UNITED STATES PATENTS

| | | | |
|---|---|---|---|
| 3,544,980 | 12/1970 | Applequist et al. | 340/174.1 E |
| 3,531,788 | 9/1970 | Brown et al. | 340/174.1 E |
| 3,034,077 | 5/1962 | Kretzmer et al. | 340/174 VB |
| 3,465,305 | 9/1969 | Cohler et al. | 340/174 VB |
| 3,184,555 | 5/1965 | Marshall | 340/174.1 K |
| 3,579,213 | 5/1971 | Applequist | 179/100.2 P |

*Primary Examiner*—Stanely M. Urynowicz, Jr.
*Attorney*—Hanifin and Jancin and Nathan N. Kallman

[57] ABSTRACT

An air bearing magnetic head arm assembly includes a rigid mount portion; a support for carrying a magnetic transducer; a spring-loaded or pretensioned portion for urging the transducer towards a record surface; and incorporates a ramp that cooperates with a stationary cam to effectuate proper loading and unloading of the head relative to the record surface. To minimize resonance effects experienced by the arm during transducing operation, a damping element is inserted between the spring portion and the rigid mount, the damping element being located at the fulcrum of the spring.

2 Claims, 3 Drawing Figures

*INVENTORS.*
RONALD F. FASANO
MICHAEL R. HATCH
JAMES E. RIGGINS

*BY Nathan N. Kallman*
ATTORNEY

ARM VIBRATION DAMPER

CROSS-REFERENCE TO RELATED APPLICATION

In U.S. Pat. No. 3,579,213 assigned to the same assignee as the instant application, a magnetic head support assembly used for accessing a storage medium, such as a magnetic disk means, is described. The present invention is an improvement of the magnetic head assembly described in this previously filed application.

BACKGROUND OF THE INVENTION

1. Field of the Invention

This invention relates to an improved magnetic head arm assembly, and in particular to an assembly that affords proper spacing and attitude between a magnetic transducer and a storage medium in a noncontact recording relation.

2. Description of the Prior Art

In some presently known storage systems, such as magnetic disk files, recording and playback are achieved by a noncontact recording technique. In such an approach, an air bearing magnetic head is spaced from the storage medium or rotating disk whereby wear and degradation of the recording surface of the medium and of the head are substantially reduced.

With the increasing necessity for higher density storage, there is a tendency to make the width of the data track on the medium and the corresponding length of the transducing gap narrower, while the magnetic coating of the storage medium is being made thinner. As a result, the attitude of the transducer relative to the recording medium, and particularly the spacing of the transducer and its sensing gap from the magnetic coating surface become more critical.

In access type disk files wherein a magnetic head assembly is mounted to an arm that is moved radially with respect to a rotating disk, it is necessary to load the head assembly to a predetermined height relative to the record surface of the rotating disk. For this purpose, the aforementioned application describes a system wherein a magnetic head arm assembly incorporates a ramp portion along one side of the arm, which coacts with a stationary cam structure so that the head arm assembly is properly loaded or unloaded relative to an associated disk surface.

However, the formation of a ramp along one side of the head arm assembly produces an asymmetry and imbalance so that there is a tendency for the head to resonate in a torsional mode. The arm tends to pivot about one edge, thereby changing the head to disk spacing from the nominal 50 microinch spacing to between 20 and 90 microinches, thereby changing the nominal head to disk spacing from the nominal 50 microinches spacing to between 20 to 90 microinches. Such variation causes unwanted changes in the amplitude of the signal being recorded or read out, and also results in a decrease in the signal-to-noise ratio.

SUMMARY OF THE INVENTION

An object of this invention is to provide an improved magnetic head arm assembly, useful for noncontact recording in an access type storage file.

Another object of this invention is to provide an air bearing magnetic head arm assembly having a built-in predetermined loading force, and which is maintained within a small range of flying height relative to the surface of a record medium.

In accordance with this invention, an air bearing magnetic head arm assembly includes a mechanical damping element located at a fulcrum point of a pretensioned loading spring, thereby minimizing resonance effects that would adversely affect signal processing. The head arm assembly is asymmetrically formed by virtue of a ramp configuration, used in cooperation with a stationary cam located in the storage apparatus, and closely spaced from the arm assembly. The ramp-cam combination serves to load and unload the magnetic head with relation to a record surface, such as a rotary magnetic disk.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 2:
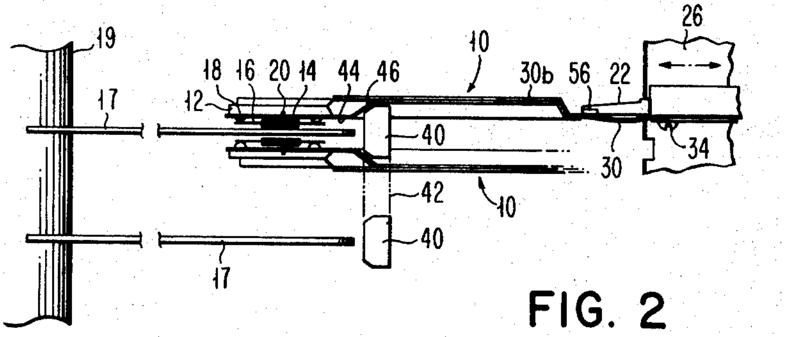
FIG. 2 is a partial side view of a mechanical assembly of a magnetic disk drive.
Figure 3:
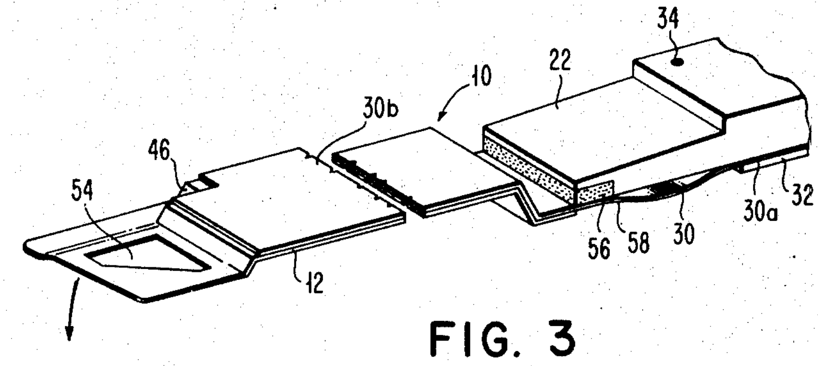
FIG. 3 is an enlarged perspective view, partially broken, depicting the damping element in relation to the elements of the head arm assembly, in accordance with this invention.

With reference to the figures of the drawing, a magnetic head arm assembly 10 comprises a support element 12 for a magnetic transducer or head shoe assembly 14, that is secured to a flexure 16, made of a flexible steel. During operation of the data processing apparatus, the flexure 16 acts as a gimbal that compensates for twist and roll of the arm assembly 10, so that the attitude and position of the head 14 is maintained virtually constant relative to the surface of a storage means, such as a magnetic disk 17. The flexure 16 is joined to the support 12 by weld buttons 18. A pin 20 is rigidly positioned at one end of the support 12, and at the other end is seated in a well formed in the head shoe 14 with freedom to move within the well. The pin 20 absorbs load effects and provides a suitable spacing between the head shoe 14 and the support structure 12.

The magnetic head arm assembly 10 also includes a rigid mount 22 having registration portions 24 and 25 that engage slots or grooves of a receiver structure 26. The receiver 26 is disposed substantially orthogonally and the slots or grooves are substantially parallel relative to the linear dimension of the arm assembly 10 and the plane of the disk means 17. The receiver 26 is movable bidirectionally in response to a drive means (not shown), which may be a voice coil actuator or linear D.C. motor that is energized by signals received from a central processing unit or computer, for example.

Coupled between the head support 12 and the mount 22 is a spring-like element 30, that achieves proper head loading during operation of the data storage apparatus, in accordance with this invention. The spring-like element 30, which is in the form of a leaf spring and functions in effect as a beam, has one portion 30*a* that is disposed adjacent to the lower surface of the mount 22, and is bent so that a second portion 30*b* abuts the top surface of the support structure 12. The portion 30*a* of the spring element is sandwiched between a clamp 32 and the mount 22 by means of two screws 34. The clamp 32 provides a fulcrum or fixed reference for the spring element 30. The screws 34 allow presetting and adjustment of the spring element 30, which in turn determines the position and alignment of the attached support 12 and head shoe 14 in both the linear and transverse directions. A fine adjustment of the linear position of the arm assembly 10 may be accomplished by means of a differential screw (not shown) disposed at the end of the mount 22. A slot formed in the side of the mount structure 22 allows such linear adjustment and accommodates a locking screw that holds the mount to the movable receiver 26.

In operation, the arm assembly 10 is either in a retracted mode, or in an advanced or extended mode for gliding head operation, as illustrated in FIG. 2. When retracted, the arm assembly 10 is seated on a cam 40, which is part of a stationary tower structure 42 embodying a series of cams 40 that are adapted to operate with similar arm assemblies. The cam 40 counteracts the loading force of the spring-loaded arm assembly 10 during the retraction or rest condition.

Figure 1:
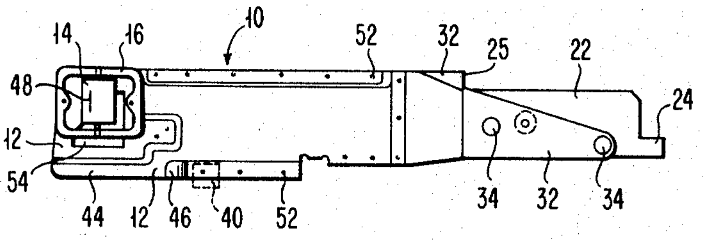
FIG. 1 is a bottom plan view of the magnetic head arm assembly employed with this invention.

When the actuator moves the receiver structure 26 from the retracted position to the extended position towards the disk 17, as in FIG. 2, a guide section 44, at one side of the head support 12 (see FIG. 1), follows the cam 40 towards the disk 17. The guide path of the support 12 includes a ramp section 46 that rides on the cam 40, and as the head support 12 descends the ramp 46, the head shoe 14 is depressed toward the surface of the rotating disk 17 by the force of the spring load. The disk means 17 rotates at a substantially constant speed on a spindle 19, and a laminar air flow is developed at each surface of the disk means. The spring element 30 operates to load the head 14 towards the disk 17, while the air bearing force supplied by the air flow adjacent to the disk surface provides an opposing hydrodynamic force or pressure to develop a spacing between the head and the disk, or a flying height for the head, which may be about 50 microinches, by way of example. In this manner, a noncontact transducing relation between the nonmagnetic transducing gap, that is formed in the magnetic core 48 of the head shoe 14, and the data tracks of the magnetic disk 17 is established.

Although the arm assembly, described above, achieves a desired head loading relative to a record surface by means of the ramp-cam coaction, the asymmetry of the arm structure causes a resonance problem. This asymmetry, characterized by the unequal distribution of the mass of the arm about its supports, results from the camming ramp being disposed along one side of the arm structure, among other things. When the head flies over the surface of the moving record medium, such as a rotating magnetic disk, the head arm is subjected to a forcing frequency determined by the product of the number of ripples on the disk surface and the rotational speed of the disk. If this forcing frequency corresponds to the arm's resonant frequency, the arm will resonate. With an arm assembly including a ramp of this type, pivoting would occur about one edge of the arm, so that resonance occurs in a torsional mode. This resonance tends to vary significantly the desired head-to-disk spacing, thereby degrading the read-write process.

In keeping with this invention, a damping element 56 is positioned between the rigid mount 22 and the spring element 30. The damping element 56, which may be made from polyurethane having a hardness of about 65 Shore A durometer, for example, is located closely adjacent to the fulcrum 58, defined by the pivot point of the spring element 30.

During operation of the storage apparatus in a transducing mode, the arm assembly tends to resonate and forces the damping block 56 to compress. The internal damping of the urethane block 56 absorbs mechanical energy from the system, and dissipates the energy in the form of heat, thereby limiting the gain of the resonance. The effect of the damping of the arm resonance is to reduce the range of flying height of the head assembly from 20–90 microinches to approximately 45–55 microinches, by way of example. This smaller flying height range ensures effective read-write operation.

There has thus been disclosed a magnetic head arm assembly that affords loading and unloading of the head relative to a record medium in response to accessing or retraction movements of the arm. Mechanical cooperation between a stationary cam and a ramp formed in the arm produces the loading and unloading action. To overcome mechanical resonance problems, a damping structure is located at an optimum position in the arm assembly.

We claim:

1. A magnetic head arm assembly useful for transducing signals recorded on a storage medium comprising:
 - a support element for supporting a magnetic transducer, said magnetic transducer subject to flying height variations as it follows the surface of said storage medium due to torsional resonance which causes oscillatory angular motion along the longitudinal axis of said arm assembly;
 - a rigid mounting element for mounting said head arm assembly to a movable receiver structure disposed within a storage apparatus;
 - a spring element coupled between said support element and said mounting element and pretensioned so that said arm assembly is constantly urged towards said storage medium, the portion of said spring element adjacent said rigid mounting element defining a fulcrum;
 - a ramp structure, formed asymmetrical in said support element for cooperating with a stationary cam, for loading and unloading said head arm assembly relative to said storage medium,
 - said storage medium exerting a reactive force against said loaded magnetic transducer so as to impart oscillatory angular motion to said arm assembly along its longitudinal axis; and
 - compressible damping means carried by said mounting element positioned adjacent said spring element along said fulcrum for dissipating energy, said angular motion of said spring element along its longitudinal axis compressing said damping means, thereby to minimize the resonance effects along the longitudinal axis of said arm assembly while minimizing flying height variations of said magnetic transducer.

2. A magnetic head arm assembly useful for transducing signals recorded on a storage medium comprising:

a support element for supporting a magnetic transducer, said magnetic transducer subject to flying height variations as it follows the surface of said storage medium due to torsional resonance which causes oscillatory angular motion along the longitudinal axis of said arm assembly, a rigid mounting element for mounting said head arm assembly to a movable receiver structure disposed with a storage apparatus;

a spring element coupled between said support element and said mounting element and pretensioned so that said arm assembly is constantly urged towards said storage medium, the portion of said spring element adjacent said rigid mounting element defining a fulcrum;

a ramp structure formed asymmetrically in said support element for cooperating with a stationary cam, for loading and unloading said head arm assembly relative to said storage medium, said storage medium exerting a reactive force against said loaded magnetic transducer so as to impart oscillatory angular motion to said arm assembly along its longitudinal axis; and a compressible resilient polyurethane element having a measured hardness of substantially 65 Shore A durometer carried by said mounting element positioned adjacent said spring element along said fulcrum for dissipating energy, said angular motion of said spring element along its longitudinal axis compressing said resilient polyurethane element, thereby to minimize resonant effects along the longitudinal axis of said arm assembly while minimizing flying height variations of said magnetic transducer.

* * * * *